US012564863B2

(12) United States Patent
Dietze, Jr. et al.

(10) Patent No.: US 12,564,863 B2
(45) Date of Patent: Mar. 3, 2026

(54) ACOUSTIC SOFTENING OF NON-NEWTONIAN MATERIAL

(71) Applicant: GM GLOBAL TECHNOLOGY OPERATIONS LLC, Detroit, MI (US)

(72) Inventors: Robert H. Dietze, Jr., Brighton, MI (US); Christopher Brady, Madison Heights, MI (US); Megan E. McGovern, Detroit, MI (US); Dmitriy Bruder, Clinton Township, MI (US); Robin James, Sterling Heights, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 945 days.

(21) Appl. No.: 17/743,199

(22) Filed: May 12, 2022

(65) Prior Publication Data

US 2023/0364633 A1 Nov. 16, 2023

(51) Int. Cl.
*B05D 3/12* (2006.01)
*B05C 5/00* (2006.01)
*B05C 5/02* (2006.01)
*B05D 1/26* (2006.01)
*H01M 10/653* (2014.01)

(52) U.S. Cl.
CPC .............. *B05D 3/12* (2013.01); *B05C 5/001* (2013.01); *B05C 5/02* (2013.01); *B05C 5/0225* (2013.01); *B05D 1/26* (2013.01); *H01M 10/653* (2015.04)

(58) Field of Classification Search
CPC ......... B05C 5/001; B05C 5/02; B05C 5/0225; B05C 17/00503; B05D 1/26; B05D 3/007; B05D 3/12; C09K 5/00; H01M 10/625; H01M 10/653
See application file for complete search history.

(56) References Cited

U.S. PATENT DOCUMENTS

| | | | | |
|---|---|---|---|---|
| 6,062,212 A | * | 5/2000 | Davison ............ | A61M 15/0066 128/200.14 |
| 2003/0100824 A1 | * | 5/2003 | Warren ................. | B05C 5/0225 600/407 |
| 2004/0000598 A1 | * | 1/2004 | Ivri ......................... | B05B 12/08 239/102.1 |
| 2010/0239785 A1 | * | 9/2010 | Planta Torralba ..... | B33Y 30/00 118/620 |
| 2017/0251713 A1 | * | 9/2017 | Warner ................... | A23P 30/20 |
| 2019/0373773 A1 | * | 12/2019 | Bougher ............... | B29C 64/106 |
| 2020/0009600 A1 | * | 1/2020 | Tan ......................... | B05B 12/08 |

(Continued)

OTHER PUBLICATIONS

Material Safety Sheet for EA 1800EV A; Revision No. 001.0; Issue date: Nov. 3, 2020; 5 Pages.

(Continued)

*Primary Examiner* — Eric S Ruppert
*Assistant Examiner* — Hans R Weiland

(57) ABSTRACT

A viscosity reduction system includes: a dispenser including: an inlet configured to receive a fluid; an outlet configured to dispense the fluid onto a surface; and a flow channel that fluidly connects the inlet with the outlet; and a vibrating device that directly contacts the dispenser at one or more locations and that is configured to vibrate the dispenser and the fluid when power is applied to the vibrating device.

20 Claims, 11 Drawing Sheets

(56) References Cited

U.S. PATENT DOCUMENTS

| 2020/0230953 A1* | 7/2020 | Martensson | ......... | B41J 2/04575 |
| 2020/0276756 A1* | 9/2020 | Sriphutkiat | ........... | B33Y 70/00 |

OTHER PUBLICATIONS

Material Safety Sheet for EA 1800EV B; Revision No. 001.0; Issue date: Nov. 3, 2020; 5 Pages.
Safety Data Sheet according to (EC) No. 1907/2006 as amended for Loctite TLB 9200 APS Part A. Revision: Jun. 24, 2021; 9 Pages.
Safety Data Sheet according to (EC) No. 1907/2006 as amended for Loctite TLB 9200 APS Part B. Revision: Jun. 24, 2021; 16 Pages.

* cited by examiner

ACOUSTIC SOFTENING OF NON-NEWTONIAN MATERIAL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to acoustic softening of material and more particularly to acoustic softening of non-Newtonian material.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a viscosity reduction system includes: a dispenser including: an inlet configured to receive a fluid; an outlet configured to dispense the fluid onto a surface; and a flow channel that fluidly connects the inlet with the outlet; and a vibrating device that directly contacts the dispenser at one or more locations and that is configured to vibrate the dispenser and the fluid when power is applied to the vibrating device.

In further features, the vibrating device includes a transducer that encircles the inlet of the dispenser and that vibrates when power is applied to the transducer.

In further features, the vibrating device includes: a transducer that vibrates when power is applied to the transducer; and a booster that boost an amplitude of the vibration from the transducer and that directly contacts the dispenser.

In further features, a control module is configured to apply power to the vibrating device at a frequency of 200 kilohertz (kHz) or less.

In further features, a heater is configured to heat at least one of the dispenser, the fluid, and the surface.

In further features, the heater includes an infrared (IR) lamp.

In further features, a second vibrating device directly contacts the surface at one or more locations and is configured to vibrate the surface and the fluid on the surface when power is applied to the second vibrating device.

In further features, the fluid is a thermal interface material.

In further features, the thermal interface material is disposed between surface and a face of a battery.

In further features: the dispenser includes a tube though which the fluid flows; and the vibrating device directly contacts the tube at one or more locations.

In further features: the dispenser includes: a central portion; outer walls; and the flow channel is disposed between the central portion and the outer walls.

In further features, the fluid is a non-Newtonian thixotropic material.

In further features, the fluid exhibits shear thinning.

In further features, a viscosity of the fluid decreases as a shear rate of the fluid increases.

In further features, the outlet is one of circular and ovular.

In a feature, a method includes: using a dispenser, dispensing a thermal interface material onto a first surface of a cooling plate, the cooling plate having the first surface and a second surface opposite the first surface; using a press, applying force to the second surface of the cooling plate and urging the thermal interface material into direct contact with a face of a battery; and using at least one vibrating device, applying vibration to at least one of the dispenser, the cooling plate, and the press.

In further features, the applying vibration to at least one of the dispenser, the cooling plate, and the press includes applying vibration to the dispenser and to the cooling plate.

In further features, the method further includes heating the thermal interface material.

In further features, the thermal interface material is a non-Newtonian thixotropic material.

In further features, the thermal interface material exhibits shear thinning.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A thermal interface material (TIM) is disposed between a cooling plate and a face of a battery. The TIM transfers heat from the battery to the cooling plate. The TIM may be dispensed onto a surface of the cooling plate, and the cooling plate may be pressed toward the battery. This pressing causes the TIM to wet out between the battery and the cooling plate.

The TIM, however, may have a relatively high viscosity. Due to the high viscosity of the TIM, a relatively large pressing force may be used to wet out the TIM. The high pressing force and the high viscosity of the TIM may damage or deform one or more components of the battery, such as one or more anodes and/or cathodes.

The present application involves vibrating the TIM to decrease the viscosity of the TIM. The vibration may be applied to a TIM dispenser during the dispensing of the TIM onto the cooling plate, to the cooling plate during the pressing of the cooling plate to the battery, and/or to the press. Heat may additionally or alternatively be applied to the TIM to decrease the viscosity of the TIM. Heat may be applied, for example, during the dispensing of the TIM onto the cooling plate and/or while the TIM is on the cooling plate. The decreased viscosity of the TIM may allow for a lower pressing force to be used and decrease a risk of possible damage to the battery.

Figure 1:
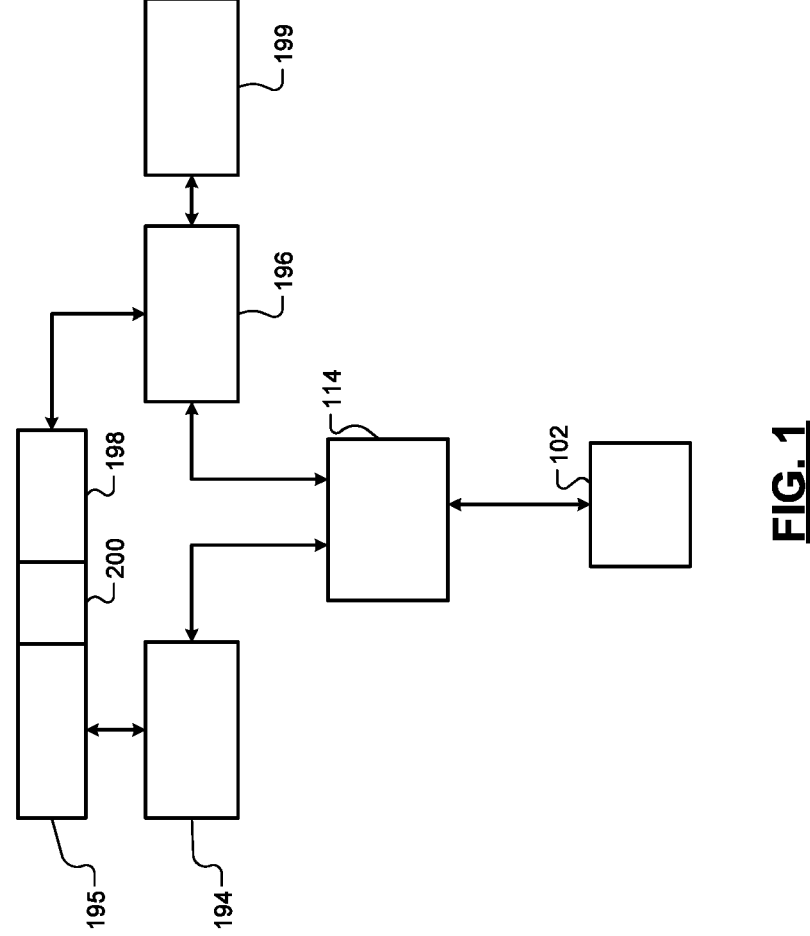
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor (also referred to as an electric machine) can act as either a generator or as a motor at a given time. When acting as a generator, an electric motor converts mechanical energy into electrical energy. The electrical energy can be, for example, used to charge a battery 199 (or battery pack). When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
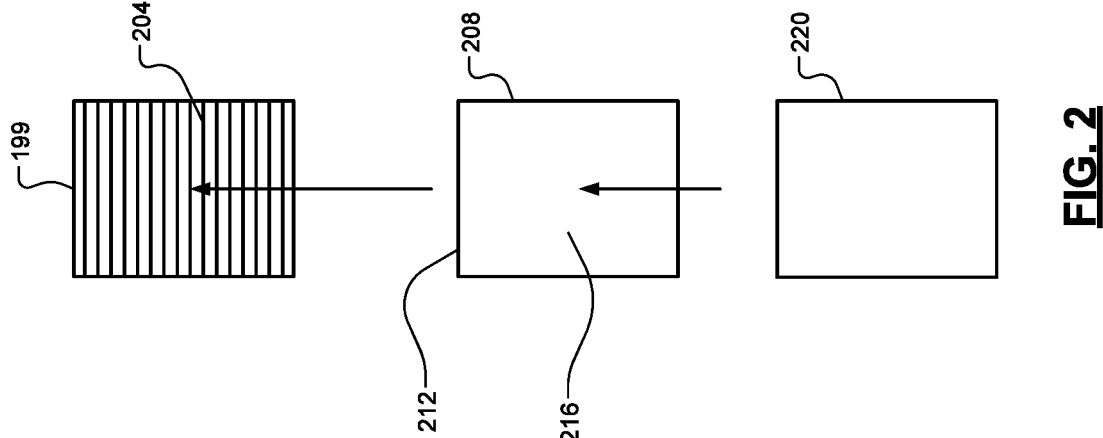
FIG. 2 is a functional block diagram of an example manufacturing system.

FIG. 2 is a functional block diagram of an example manufacturing system. The battery 199 includes a plurality of cells, each cell including at least one anode such as 204, and at least one cathode. In various implementations, the battery 199 may include a plurality of battery modules, where each battery module includes a plurality of cells.

A cooling plate 208 is used to cool the battery 199. A coolant may be circulated through cooling channels in or on the cooling plate 208. The cooling plate 208 includes a first side (surface) 212 that faces the battery 199 and a second side (surface) 216 that is opposite the first side 212. As discussed further below, a thermal interface material (TIM) is applied to the first side 212 of the cooling plate 208 and sandwiched between the cooling plate 208 and the battery 199. A press 220 or another suitable type of device applies force to the second side 216 of the cooling plate 208 to spread out the TIM to maximize a contact area of the TIM with the battery 199 and the cooling plate 208. The TIM transfers heat between the cooling plate 208 and the battery 199.

Figure 3:
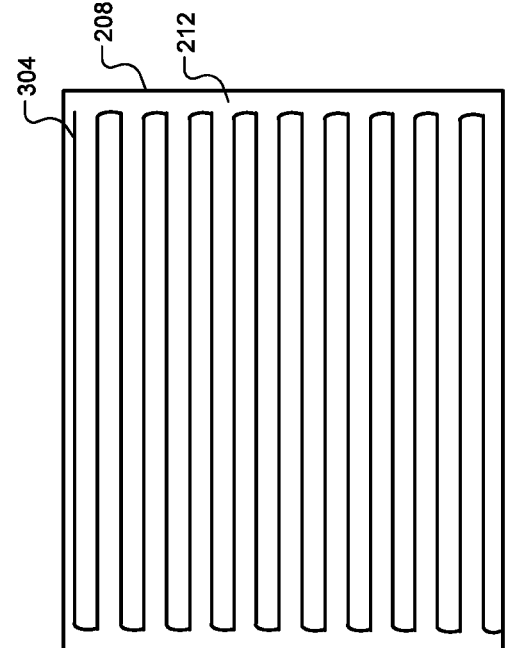
FIG. 3 includes an example perspective view toward a first surface of a cooling plate.

FIG. 3 includes an example perspective view toward the first side 212 of the cooling plate 208. As stated above, TIM 304 is disposed on the first side 212 of the cooling plate 208 before being sandwiched between the cooling plate 208 and the battery 199. An example pattern of deposition of the TIM 304 on the first side 212 is shown, but other patterns may be used.

Generally speaking, the TIM 304 has a high viscosity when at rest. The TIM 304, however, exhibits non-Newtonian thixotropic (shear thinning) characteristics. The TIM 304 may be, for example, the EA 1800 EV A thermal conductive material by Henkel, the EA 1800 EV A thermal conductive material by Henkel, or another suitable type of thermally conductive material.

Figure 4:
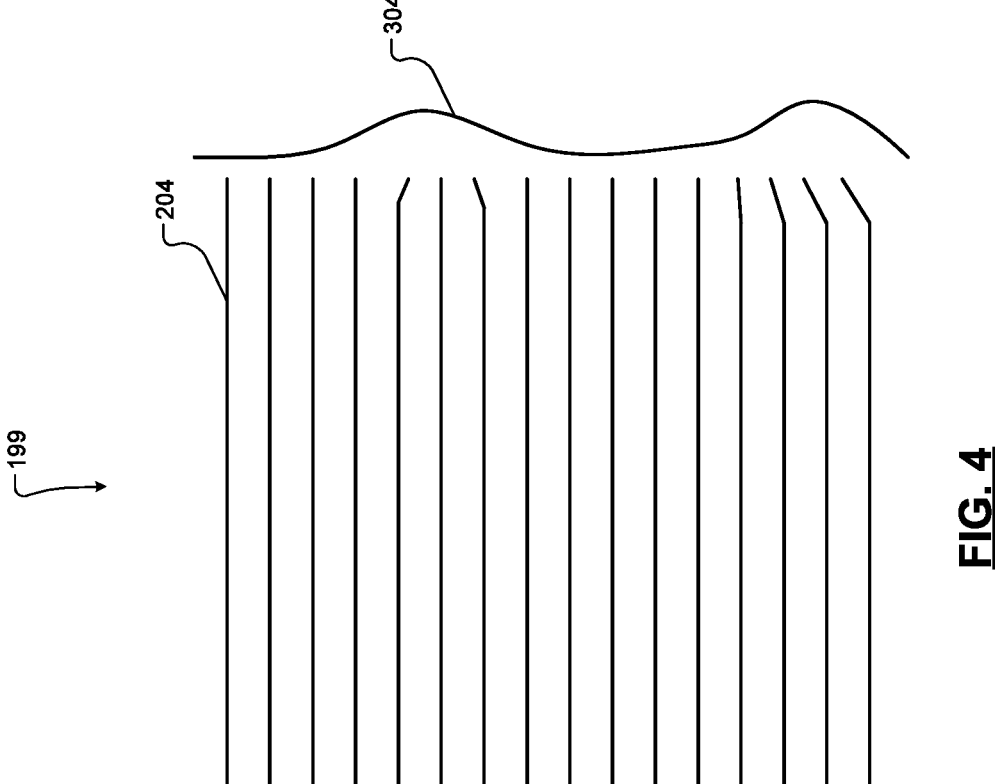
FIG. 4 is a cross-sectional view of anodes of a battery and a thermal interface material after being sandwiched between the cooling plate and the battery.

FIG. 4 is a cross-sectional view of the anodes 204 of the battery and the TIM 304 after being sandwiched between the cooling plate 208 and the battery 199. As illustrated, the high viscosity of the TIM 304 may require the use of a large force by the press 220 to achieve wet out of the TIM 304. Wet out may refer to the TIM 304 being compressed and completely covering the entire face of the battery 199. The large force and the high viscosity of the TIM 304 may cause deformation or breaking of one or more portions of the battery 199, such as one or more of the anodes 204. Breaking of an anode may cause a decrease in output voltage of the battery due to, for example, serving as lithium dendrite growth initiation site which may eventually cause short circuiting due to separator puncture, and/or one or more faults in the battery 199.

The present application involves applying vibration (e.g., acoustic) to one or more of (a) the TIM 304 during deposition, (b) the cooling plate 208 during the application of force to the cooling plate 208, and (c) the press 220 during the application of force to the cooling plate 208. Heat may additionally or alternatively be applied to warm the TIM 304. The vibration and/or heat decreases the viscosity of the TIM 304 allowing for less force to be used to wet out the TIM 304, thereby decreasing a risk of damage to the battery 199. While the example of the TIM 304 is provided, the present application is also applicable to vibration of other materials, such as one or more types of adhesives.

Figure 5:
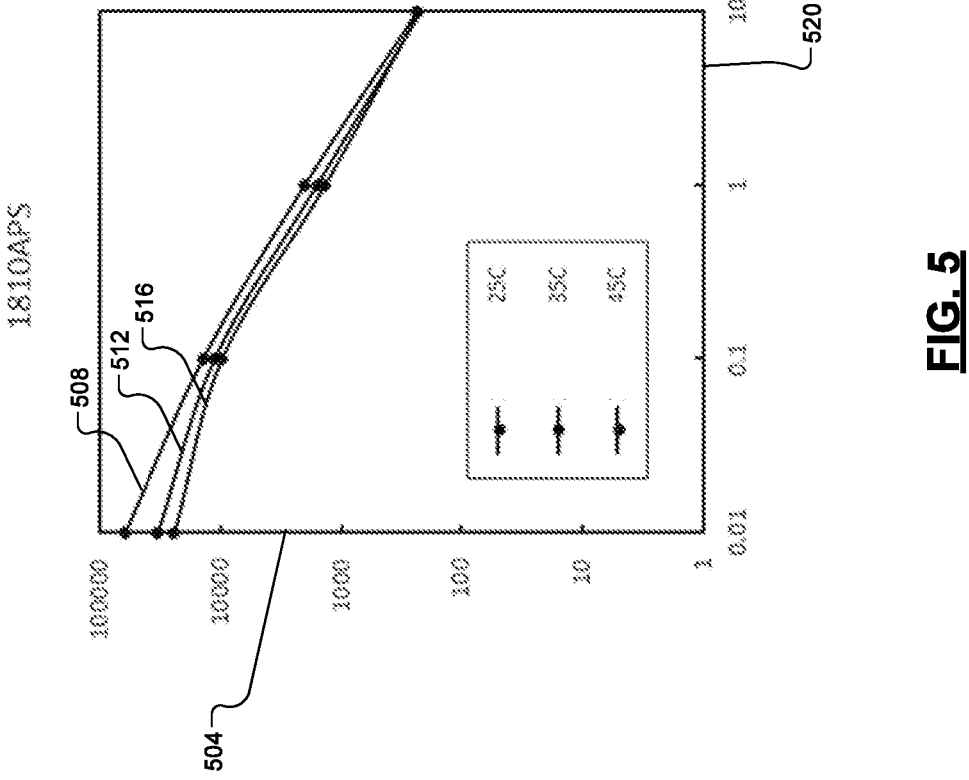
FIG. 5 includes an example graph of viscosity at different temperatures as a function of shear rate from vibration.

FIG. 5 includes an example graph of viscosity 504 of the TIM 304 at different temperatures 508, 512, and 516, as a function of shear rate 520 from vibration. As illustrated, the viscosity of the TIM 304 decreases as the shear rate increases, and vice versa. The viscosity of the TIM 304 also decreases as temperature increases and vice versa.

Figure 6:
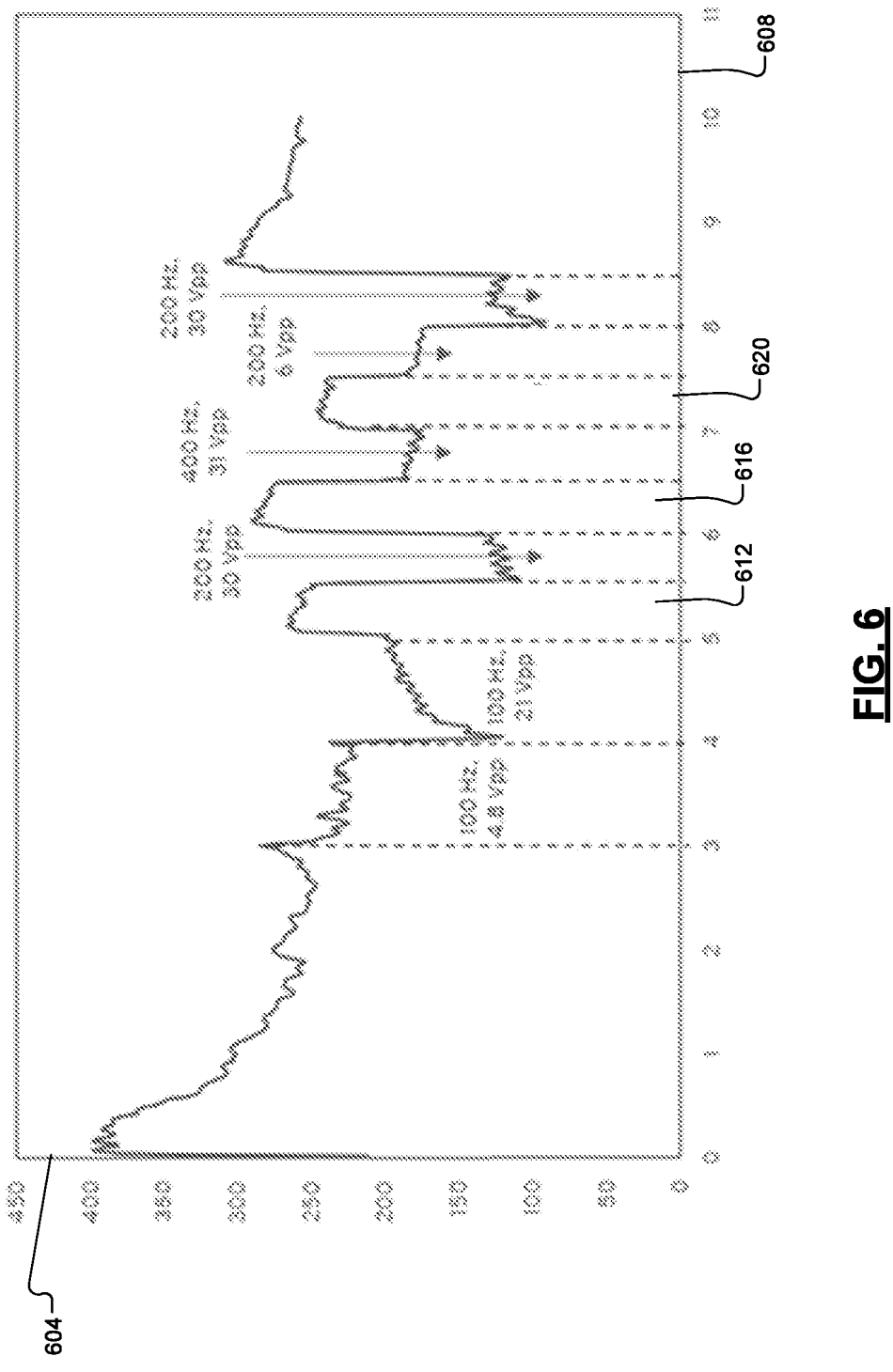
FIG. 6 includes an example graph of viscosity over time with different frequencies and amplitudes of vibration.

FIG. 6 includes an example graph of viscosity 604 of the TIM 304 over time (in minutes) 608 with different frequencies and amplitudes of vibration. As illustrated, different frequencies and amplitudes of vibration change the viscosity of the TIM 304. Periods of no vibration (OFF) are also included, such as 612 616 and 620. As illustrated, the viscosity of the TIM 304 increases shortly after the vibration is turned off. Vibration during the application of force to the cooling plate 208 may therefore help minimize the amount of force to wet out the TIM 304.

Figure 7:
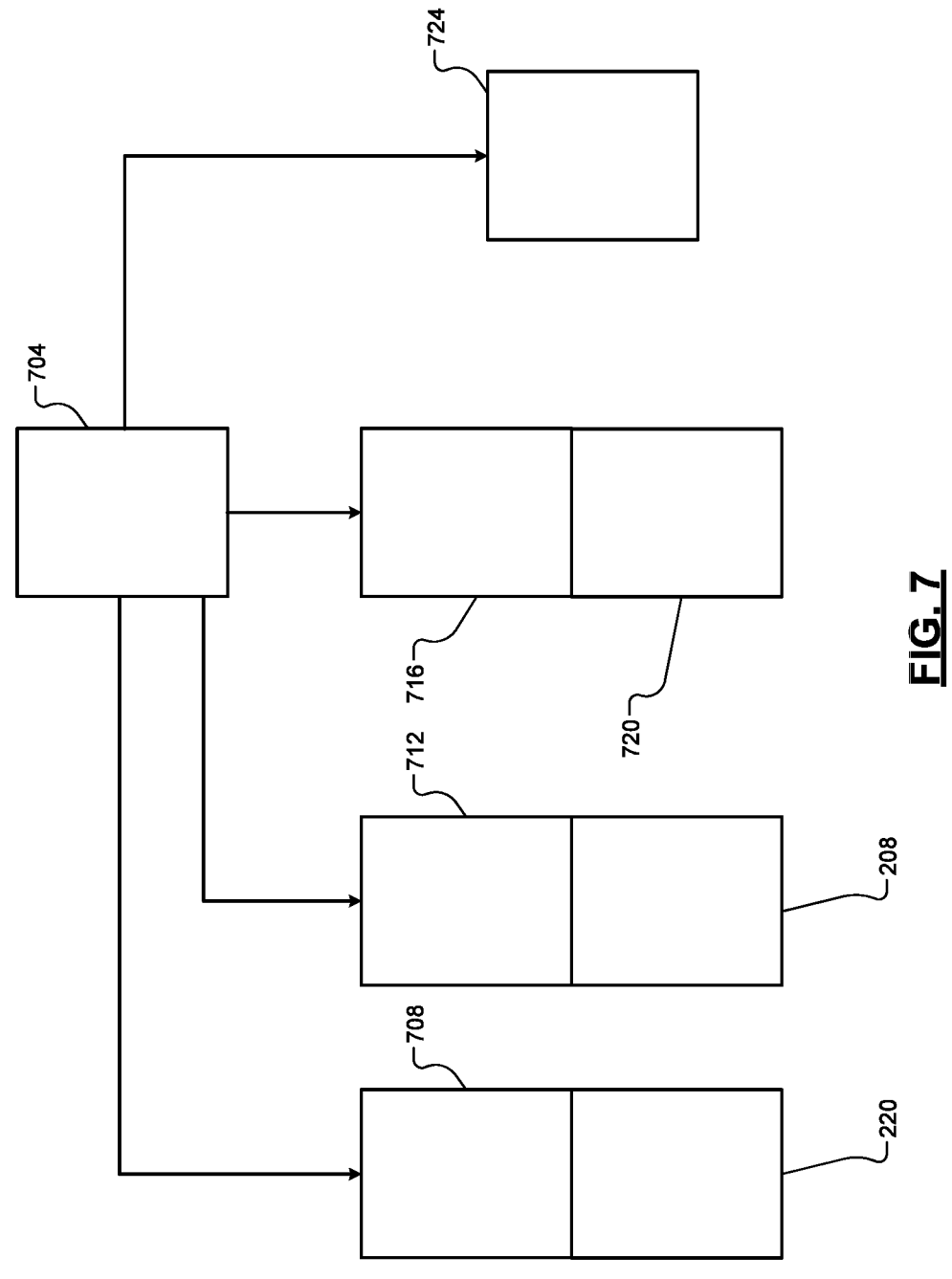
FIG. 7 is a functional block diagram of an example viscosity reduction system.

FIG. 7 is a functional block diagram of an example viscosity reduction system. A control module 704 controls the frequency and magnitude of power applied to one or more vibrating devices, such as a vibrating device 708 that vibrates the press 220, a vibrating device 712 that vibrates the cooling plate 208, and a vibrating device 716 that vibrates a TIM dispenser 720 that dispenses the TIM 304 onto the cooling plate 208. The vibrating devices vibrate based on the frequency and magnitude of the power applied to the vibrating devices. For example only, the control module 704 may apply power to a vibrating device at a frequency that is 100 kilohertz (kHz) or less, 50 kHz or less, between 100 Hz and 40 kHz, or another suitable frequency. As examples of magnitude, the control module 704 may apply power to a vibrating device at less than 50 volts peak to peak (Vpp), less than 40 Vpp, between 3 and 35 Vpp, or having another suitable peak to peak voltage. The control module 704 may control the maximum peak to peak displacement of the vibrating device 712. As examples, peak to peak displacement may be, for example, 5 mm or less. Amplitude may be increased as the frequency decreases and vice versa.

The specific acoustic parameters around achieving the appropriate reduction in viscosity may depend not only on the desired viscosity reduction of a particular material, but also on the vibrational excitation mechanism or shaker. Generally speaking, a higher energy acoustic wave, which is both a function of displacement amplitude and number of cycles (i.e., frequency), may cause more viscosity reduction. For a given input voltage or current to the shaker, the resulting output displacement amplitude may depend upon the characteristics of the shaker as well as the payload. For a highly viscous material, this payload can be high. For the same displacement, higher frequencies may involve more input current/voltage to drive the shaker. For example, for the same driving current, a 400 Hz acoustic input will result in a smaller viscosity reduction (e.g., 100 Pa-s reduction) than a 200 Hz input (e.g., 150 Pa-s reduction), because the resulting shaker displacement and therefore material displacement may be smaller.

Consider a linear solenoid (shaker/vibrating device) with a range of vibrational displacement of 4 mm peak-to-peak displacement for a range of 10 Hz to 20 kHz. Driving such a transducer at its maximum peak-to-peak displacement range at a high frequency, may be taxing on the transducer and therefore may be avoided. Furthermore, such an amplitude may not be required to achieve a large reduction in viscosity. Ultrasonic weld horns can provide an input frequency of 20 or 40 kHz and have high output energy to enable welding, but result in a much lower displacement.

In view of the above, the ranges for achievable viscosity reduction may fall within a displacement range of 0.5 mm to 5 mm (for a given volume of material) and a frequency range of 1 Hz to 200 kHz for the viscosity reduction. Taking advantage of resonance may enable frequencies outside of this range since resonance conditions may result in greater displacement amplitudes. In all cases, the specifics may be set based upon material characteristics and shaker type.

The control module 704 may apply power to the vibrating device 708 (and cause vibration of the vibrating device 708) of the press 220 while the press 220 is applying force to the cooling plate 208. The control module 704 may apply power to the vibrating device 712 (and cause vibration of the vibrating device 712) of the cooling plate 208 while the press 220 is applying force to the cooling plate 208 and/or during dispensing of the TIM 304 onto the cooling plate 208. The control module 704 may apply power to the vibrating device 716 (and cause vibration of the vibrating device 716) of the TIM dispenser 720 during dispensing of the TIM 304 onto the cooling plate 208. The vibration decreases the viscosity of the TIM 304.

Figure 9:
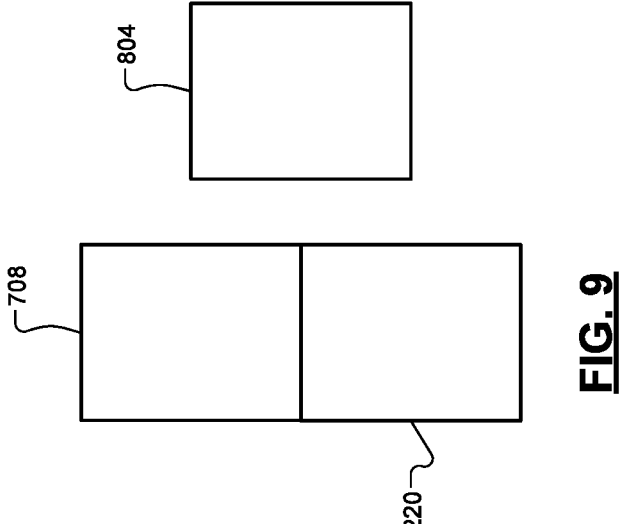
FIGS. 8 and 9 are example block diagrams of heaters of the cooling plate and a press.
Figure 8:
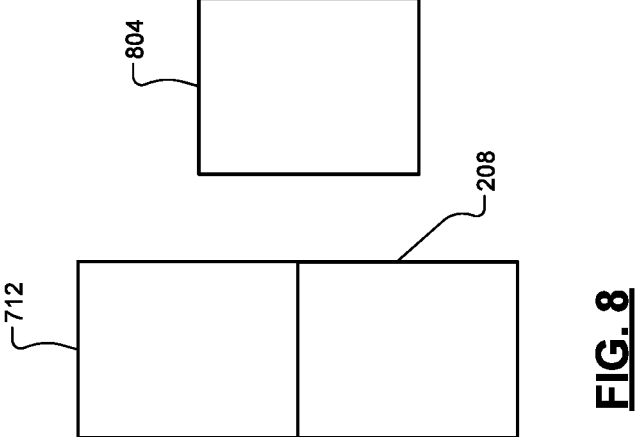

The control module 704 may additionally or alternatively control the application of power to one or more heaters, such as heater 724. The heater 724 may include, for example, one or more heat (e.g., infrared) lamps, or one or more other types of heaters (e.g., resistive heaters). The heater 724 may heat the TIM dispenser 720, the cooling plate 208, and/or the press 220. The control module 704 may apply power to the heater(s) (and cause the heaters to generate heat) while the press 220 is applying force to the cooling plate 208 and/or during dispensing of the TIM 304 onto the cooling plate 208. The heat decreases the viscosity of the TIM 304. FIGS. 8 and 9 are example block diagrams of heaters 804 of the cooling plate 208 and the press 220.

Figure 10:
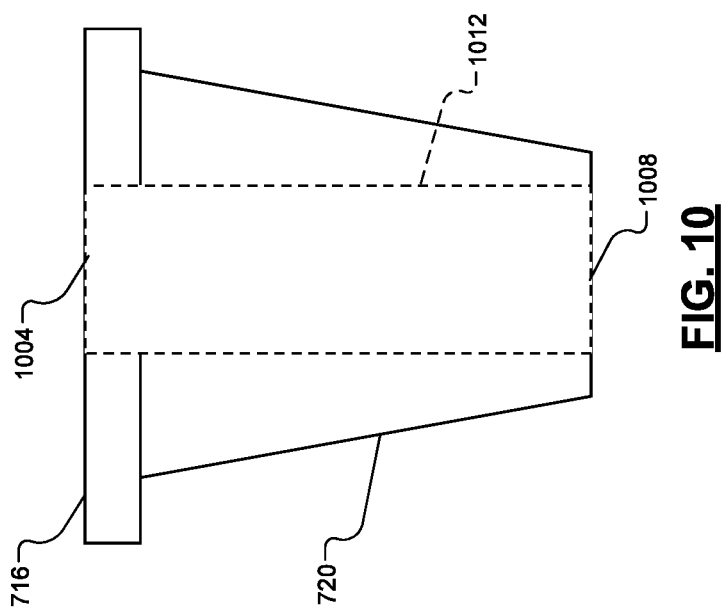
FIGS. 10-12 are cross-sectional views of example implementations of a dispenser of a non-Newtonian fluid and a vibrating device.

FIG. 10 is a cross-sectional view of an example implementation of the TIM dispenser 720 and the vibrating device 716. In the example of FIG. 10, an outer surface of the TIM dispenser 720 is frustoconical. The TIM dispenser 720 includes an inlet 1004 where the TIM dispenser 720 receives fluid TIM and an outlet 1008 where the TIM dispenser 720 outputs the TIM, such as onto the cooling plate 208. A flow channel 1012 fluidly connects the inlet and the outlet 1004 and 1008. The outlet 1008 may be circular, ovular, or have another suitable shape. The outlet 1008 having an oval shape may allow a thickness of the TIM to be minimized, which may allow for decreased force to be applied during the pressing.

The vibrating device 706 surrounds the TIM dispenser 720 in the example of FIG. 10. The vibrating device 706 may be, for example, an acoustic (e.g., ultrasonic) transducer or another suitable type of vibrating device. The acoustic transducer vibrates when power is applied. The TIM is input to the TIM dispenser 720 from a TIM source. In various implementations, the control module may control operation of one or more devices (e.g., pumps) that input the TIM to the TIM dispenser 720.

Figure 11:
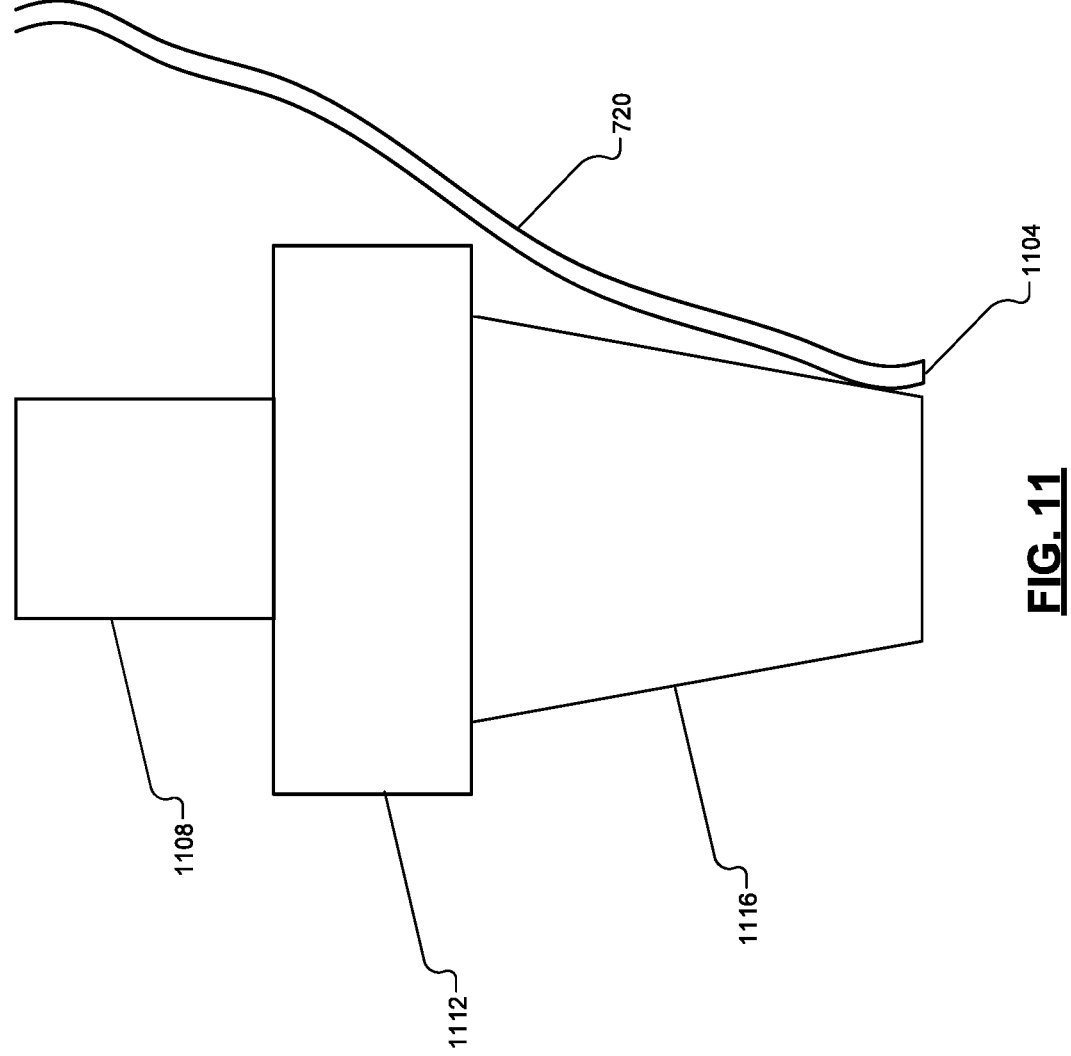

FIG. 11 is a cross-sectional view of an example implementation of the TIM dispenser 720 and the vibrating device 716. In the example of FIG. 11, the TIM dispenser 720 may be a tube, and the TIM may be dispensed from an outlet 1104 of the tube.

In the example of FIG. 11, the vibrating device 716 includes an acoustic (e.g., ultrasonic) transducer 1108, an acoustic booster 1112, and a horn 1116. The acoustic transducer 1108 generates vibrates when power is applied. The acoustic booster 1112 amplifies a magnitude of the vibration and applies the (amplified) vibration to the horn. The horn 1116 may directly contact the TIM dispenser 720 at one or more locations, such as within a predetermined distance of the outlet 1104. The TIM dispenser 720 receives vibration from the horn 1116.

Figure 12:
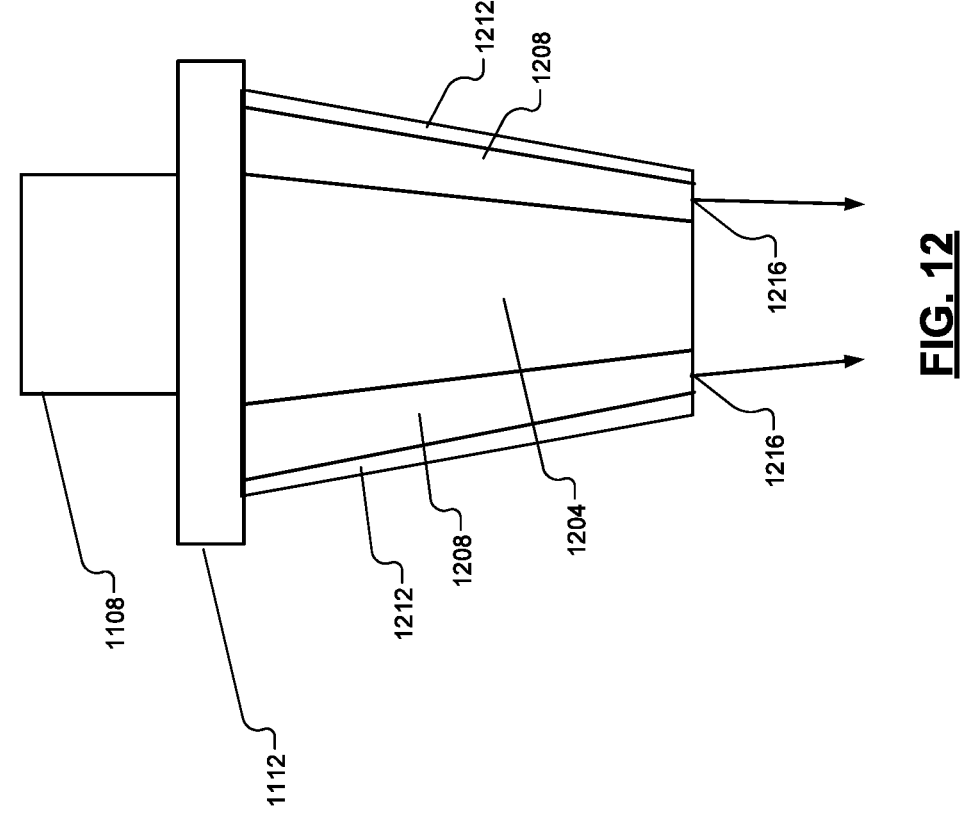

FIG. 12 is a cross-sectional view of an example implementation of the TIM dispenser 720 and the vibrating device 716. In the example of FIG. 12, the TIM dispenser 720 includes a frusta conical shaped central portion 1204. The central portion 1204 may be solid in various implementations. The TIM flows through a flow channel 1208 that is disposed between the central portion 1204 and outer walls 1212 of the TIM dispenser 720. The TIM is dispensed via an outlet 1216. In the example of FIG. 12, the outlet is O-shaped. The acoustic booster 1112 may directly contact the outer walls 1212 and/or directly contact the central portion 1204. The acoustic booster 1112 may surround the outer walls 1212. The acoustic transducer 1108 generates vibrates when power is applied. The acoustic booster 1112 amplifies a magnitude of the vibration and applies the (amplified) vibration to the horn.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A viscosity reduction system comprising:
a dispenser including:
an inlet configured to receive a fluid;
an outlet configured to dispense the fluid onto a surface; and
a flow channel that fluidly connects the inlet with the outlet;
a first vibrating device that directly contacts the dispenser at one or more locations and that is configured to vibrate the dispenser and the fluid when power is applied to the first vibrating device; and
a second vibrating device that directly contacts the surface at one or more locations and that is configured to vibrate the surface and the fluid on the surface when power is applied to the second vibrating device.

2. The system of claim 1 wherein the first vibrating device includes a transducer that encircles the inlet of the dispenser and that vibrates when power is applied to the transducer.

3. The system of claim 1 wherein the first vibrating device includes:

a transducer that vibrates when power is applied to the transducer; and
a booster that boost an amplitude of the vibration from the transducer and that directly contacts the dispenser.

4. The system of claim 1 further comprising a control module configured to apply power to the first vibrating device at a frequency of 200 kilohertz (kHz) or less.

5. The system of claim 1 further comprising a heater configured to heat at least one of the dispenser, the fluid, and the surface.

6. The system of claim 5 wherein the heater includes an infrared (IR) lamp.

7. The system of claim 1 wherein the fluid is a thermal interface material.

8. The system of claim 7 wherein the thermal interface material is disposed between the surface and a face of a battery.

9. The system of claim 1 wherein:
the dispenser includes a tube though which the fluid flows; and
the first vibrating device directly contacts the tube at one or more locations.

10. The system of claim 1 wherein:
the dispenser includes:
a central portion;
outer walls; and,
the flow channel is disposed between the central portion and the outer walls.

11. The system of claim 1 wherein the fluid is a non-Newtonian thixotropic material.

12. The system of claim 1 wherein the fluid exhibits shear sheer-thinning.

13. The system of claim 1 wherein a viscosity of the fluid decreases as a shear rate of the fluid increases.

14. The system of claim 1 wherein the outlet is one of circular and ovular.

15. A method comprising:
using a dispenser, dispensing a thermal interface material onto a first surface of a cooling plate, the cooling plate having the first surface and a second surface opposite the first surface;
using a press, applying force to the second surface of the cooling plate and urging the thermal interface material into direct contact with a face of a battery;
using a first vibrating device, applying vibration to the dispenser; and
using a second vibrating device, vibrating at least one of the cooling plate and the press when power is applied to the second vibrating device.

16. The method of claim 15 wherein the applying vibration to at least one of the cooling plate and the press includes applying vibration to the cooling plate.

17. The method of claim 15 further comprising heating the thermal interface material.

18. The method of claim 15 wherein the thermal interface material is a non-Newtonian thixotropic material.

19. The method of claim 15 wherein the thermal interface material exhibits shear thinning.

20. A viscosity reduction method, comprising:
by a first vibrating device that directly contacts a dispenser at one or more locations, vibrating the dispenser and a fluid when power is applied to the first vibrating device, the dispenser including:
an inlet configured to receive the fluid;
an outlet configured to dispense the fluid onto a surface; and a flow channel that fluidly connects the inlet with the outlet; and by a second vibrating device that directly contacts the surface at one or more locations, vibrating the surface and the fluid on the surface when power is applied to the second vibrating device.

* * * * *

5